Jan. 4, 1949.　　J. BUECHEK　　2,458,338
DOUGH FOLDING MACHINE
Filed Sept. 25, 1943
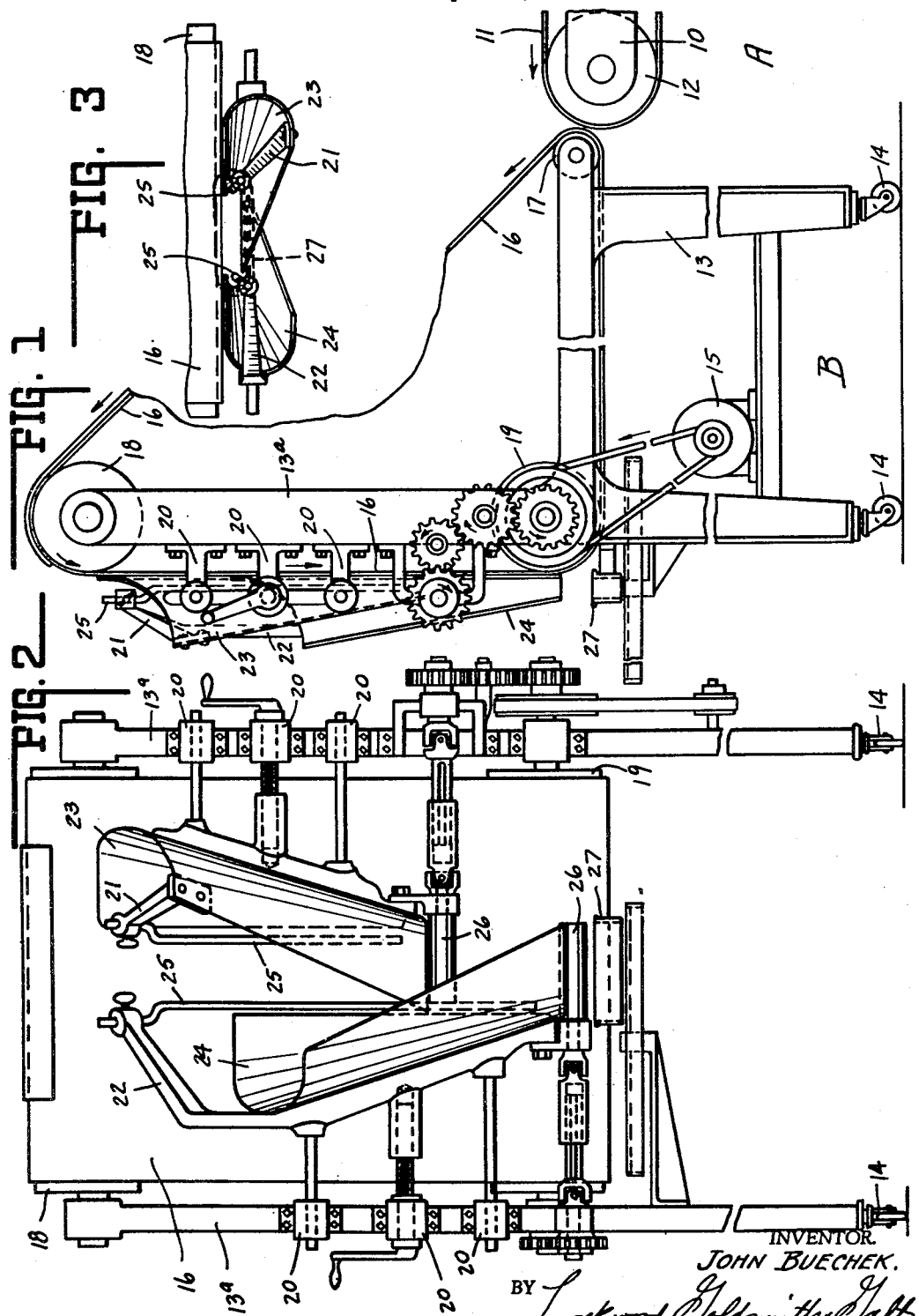
INVENTOR.
JOHN BUECHEK.
BY
Lockwood, Goldsmith & Galt
ATTORNEYS.

Patented Jan. 4, 1949

2,458,338

UNITED STATES PATENT OFFICE 2,458,338

DOUGH FOLDING MACHINE

John Buechek, Kokomo, Ind., assignor, by mesne assignments, of one-half to American Bakers Machinery Company, St. Louis, Mo., a corporation Application September 25, 1943, Serial No. 503,739

4 Claims. (Cl. 107—9)

This invention relates to a folder and method of folding dough.

Heretofore dough has been rolled as supplied from a continuously advancing dough sheet on a belt but folding over was not practicable for the reason that the dough so folded would collapse before complete folding was accomplished.

In the baking industry "sticks" of plain or twisted type are hand formed from strips cut from a "throw" or batch of dough rolled to the desired sheet thickness and suitably coated with cream paste or cinnamon, shortening and sugar. These coated strips lying flat on the bench at one side of a conveyor are then hand folded and when so folded are returned to the belt and fed to a cutter or are cut on the bench, etc. This hand folding operation is possible because the length handled is not excessive.

Reference by way of illustration is here made to the copending application Serial No. 414,760 filed October 13, 1941, allowed April 5, 1943, entitled Baking dough rolling machine, now Patent No. 2,337,539, dated December 28, 1943, and same is made a part hereof for this disclosure as follows:

Therein is disclosed means for forming and continuously supplying an advancing sheet of dough of predetermined thickness and width. This sheet has applied to its upper surface melted shortening and suitable material such as sugar and cinnamon and/or cream paste, except for a narrow space at one side edge of the sheet which is moistened.

As set forth in said disclosure the roll-up device, opposed pressure belts and the cutoff device may be swung away from the belt or detached as desired.

The end of this conveyor belt, see said patent, herein discharges the upper surface coated dough sheet to an elevator which feeds substantially vertically the coated sheet to edge inturning structures. It has been discovered the dough, even though of non-sustaining character and incapable of folding over when fed horizontally, or similarly, can be folded over when fed vertically or nearly so.

First the one third of the width of the sheet, opposite the moistened edge, is progressively folded over the middle third and sustained against slumping, sagging or buckling if desired and when folded can be pressure contacted if desired. Then the other third of the sheet width is folded over the first third in like but reversed manner so that the moistened edge contacts the back face of the dough sheet where the first fold has been made, thus sealing the folded portions together. Same may be pressure contacted if desired.

The foregoing naturally is continuous so that this folded portion is then supplied to a quick chop off cutter such as shown in the right hand ends of Figs. 1 and 2 of said copending patented disclosure except that instead of tube 148, see Fig. 1 of the patent, being circular as shown it would be flattened as illustrated herein.

The folder herein naturally would feed the folded strip to such a flattened tube at the end of which the cutter would operate in timed relation to the sheet feed so that predetermined widths would be cut off. These widths if successively dropped into manually or automatically manipulated pans would result in plain sticks. If hand twisted and then panned the result would be twisted sticks.

Having thus briefly described the method portion of this invention, the object of which is to eliminate hand labor, increase production, and form identical sticks continuously, reference will now be had to the apparatus for practicing said process and in view of the aforesaid copending Patent No. 2,337,539 the present disclosure will be materially reduced.

Other objects and features of this invention will be set forth more fully hereinafter, as well as more specific details of said process.

The full nature of the invention will be understood from the accompanying drawings and the following description and claims.

In the drawings Fig. 1 is a side elevation of a bakery unit including the elevator, folder and cut off portions, as well as the discharge end of a unit illustrated in said patent from which the roll up, opposed pressure belts and cut off device has been removed.

Fig. 2 is an elevational view looking at the folding face of the unit.

Fig. 3 is a top plan view of that portion of the unit.

In Fig. 1 of the drawings 10 indicates the frame of the discharge end of the patented disclosure having the sheet supporting belt 11 passing over roller 12. As previously set forth, the sheet of dough of predetermined width and thickness, devoid of air pockets, etc. and surface coated has one moistened edge.

13 indicates the frame of a folder attachment provided with casters 14 and carrying a source of power 15. While this may be independent and provide for selective speed control of endless belt 16 preferably this belt travels at the same speed as belt 11. If desired power from the right hand machine (Fig. 1) can be extended to the portable unit to the left thereof so both belts would have the same linear speed.

The machine frame suports three rollers 17, 18 and 19 at least one of which is power driven. This preferably is roller 19 and roller 17 may be adjustably mounted for belt tightening purposes. Roller 19, being power driven, insures no slack in the substantially vertical run of belt 16. The preceding run is inclined upwardly preferably at an angle of 45° or less.

When unit B is positioned adjacent unit A the ingredient covered dough sheet is fed to the former and carried upwardly and over roll 18. The cream paste, etc., now sufficiently adheres to the dough so that it will not fall or slough off.

Reference will now be had to Figs. 1, 2 and 3. Brackets 20 are carried by the main frame 13a of unit B. Adjustably mounted on the brackets 20 and capable of adjustment towards and away from each other are two folding members with arms 21 and 22, the right one being the shorter and the left one the longer because the left hand edge of the covered sheet is bare and moistened and folded last.

The right hand arm 21 is rigid with an infolding member 23 that folds the right hand third of the advancing dough sheet upon the middle third thereof. The left hand arm 22 is rigid with an infolding member 24 that folds the left hand third of the dough sheet to the left and over the previously folded two thirds of the sheet. The moistened edge is last folded so as to register with the first fold junction.

While it may be said that folders 23 and 24 are complementary it is noted, see Fig. 3, that the first (right) folder is not as thick, fore and aft, as the second (left) folder.

Rigid with each folder and carried thereby in vertical alignment with where the actual fold will occur is a maintaining bar 25. These hold the nonfolding portion of the dough sheet against the vertical run of belt 16 and the back plate of the folder adjacent thereto. Note each bar 25 terminates short of the lower end and within its folder.

Note in Fig. 2 that the two folders are longitudinally offset relative to dough travel, because each projects over towards the other at the discharge end.

Immediately beneath each former is a roller 26 that is of stick width and rotatable at a speed and in a direction equal and parallel to belt 16 speed and direction. Each roller, below each former, is arranged to exert a predetermined (adjusted) pressure on the folded portion therebetween it and the belt 16.

The completely folded dough mass then passes into the elongated flattened tube 27 below which operates a cutter of any desired type such as that illustrated in the copending patent.

By the reference to water as herein used, this term is intended to comprehend within its scope water per se or an aqueous solution including milk, a syrup or the like, or other liquid suitable for the purpose described.

While the invention has been illustrated and described in great detail in the drawings and foregoing description, the same is to be considered as illustrative and not restrictive in character.

The invention claimed is:

1. Apparatus for continuously folding a continuously advancing sheet of dough including an endless belt having a downwardly directed run and a pair of confronting elongated U-shaped turning members adjustable towards and away from each other and vertically disposed forwardly of the belt run, with their belt adjacent faces lying substantially coplanar, said belt adjacent faces being generally triangular in projected outline and with their respective base lines disposed uppermost, the opposite faces of said U-shaped members being spaced forwardly from said belt adjacent faces and having a generally triangular projected outline with their vertices uppermost, so as to lie in a reversed relation with respect to the said adjacent belt faces, the said U-shaped turning members being vertically offset relative to each other in an amount less than the length of either member, elongated means rigid with each turning member and disposed immediately forward of the belt adjacent face for dough sheet travel therebetween and sheet fold location determination, and endless pressure means for each turning member having a portion disposed immediately adjacent the lowermost end of the member and movable with the same.

2. Apparatus as defined by claim 1 wherein the elongated means are of unequal length and the upper ends thereof are disposed opposite each other, said member being substantially parallel.

3. Apparatus as defined by claim 1 wherein each turning member with its immediately associated elongated means and endless pressure means is adjustable across the belt run.

4. Apparatus as defined by calim 1 wherein the endless pressure means has its dough contacting portion advancing in the direction of dough travel, and means for causing both endless means last mentioned portions to advance at the same rate.

JOHN BUECHEK.

REFERENCES CITED

The following references are of record in the file of this patent:

UNITED STATES PATENTS

| Number | Name | Date |
|---|---|---|
| 381,554 | Humble | Apr. 24, 1888 |
| 628,449 | Carr | July 11, 1899 |
| 1,176,648 | Callow | Mar. 21, 1916 |
| 1,369,724 | Benz | Feb. 22, 1921 |
| 1,553,955 | Parsons | Sept. 15, 1925 |
| 2,282,126 | Gabbert | May 5, 1942 |